(12) United States Patent
Uchida

(10) Patent No.: US 9,280,309 B2
(45) Date of Patent: Mar. 8, 2016

(54) PRINT FUNCTION LIMITING METHOD AND PRINT CONTROL APPARATUS

(75) Inventor: Tatsuro Uchida, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 491 days.

(21) Appl. No.: 12/160,355

(22) PCT Filed: Mar. 26, 2007

(86) PCT No.: PCT/JP2007/057326
§ 371 (c)(1),
(2), (4) Date: Jul. 9, 2008

(87) PCT Pub. No.: WO2007/114403
PCT Pub. Date: Oct. 11, 2007

(65) Prior Publication Data
US 2010/0157343 A1     Jun. 24, 2010

(30) Foreign Application Priority Data
Mar. 31, 2006  (JP) .................................. 2006-100399

(51) Int. Cl.
*G06F 3/12* (2006.01)
*G06F 17/30* (2006.01)
(Continued)

(52) U.S. Cl.
CPC .......... *G06F 3/1288* (2013.01); *G03G 15/5087* (2013.01); *G03G 15/5091* (2013.01);
(Continued)

(58) Field of Classification Search
CPC ..... G06F 3/1206; G06F 3/121; G06F 3/1238; G06F 3/1239; G06F 3/1241; G06F 3/1253; G06F 3/1254; G06F 3/1255; G06F 3/1256; G06F 3/1264; G06F 3/1284; G06F 21/629; G06K 15/007; G06K 15/1809; G06K 15/18; H04N 1/4433; H04N 1/0048; H04N 1/00832
USPC .......................... 358/1.11–1.18, 1.1, 1.9, 2.1; 715/273–277; 726/26, 31
See application file for complete search history.

(56) References Cited

U.S. PATENT DOCUMENTS 6,796,730 B2   9/2004  Toda et al.
6,924,826 B1 * 8/2005  Nakagiri ............... G06F 3/1204
                                          358/1.15

(Continued)

FOREIGN PATENT DOCUMENTS

CN      1517851 A       8/2004
JP      2001-188663     7/2001
(Continued)

OTHER PUBLICATIONS

Chinese Office Action corresponding to Chinese Patent Application No. 200780011673.5.

(Continued)

*Primary Examiner* — Chad Dickerson
(74) *Attorney, Agent, or Firm* — Fitzpatrick, Cella, Harper & Scinto

(57) ABSTRACT

A setting information editing unit of a printer driver changes the print setting of an input print job. Upon changing the print setting, a print function is limited by inhibiting selection of the print function provided by the printer driver in accordance with a print authorization processed by a print authorization processing unit. Since the resetting process after inputting the print job to a print control apparatus is also subjected to print function limitation, the print function can be limited upon print job input. Hence, consistent print function limitation can be done.

5 Claims, 16 Drawing Sheets

(51) Int. Cl.
*G03G 15/00* (2006.01)
*G06F 21/60* (2013.01)
*G06K 15/00* (2006.01)

(52) U.S. Cl.
CPC .............. *G03G15/55* (2013.01); *G03G 15/553* (2013.01); *G06F 3/1219* (2013.01); *G06F 3/1222* (2013.01); *G06F 3/1238* (2013.01); *G06F 3/1239* (2013.01); *G06F 21/608* (2013.01)

(56) References Cited

U.S. PATENT DOCUMENTS

| | | | |
|---|---|---|---|
| 7,131,775 | B2 | 11/2006 | Uchida et al. |
| 7,168,868 | B2 | 1/2007 | Uchida et al. |
| 7,202,968 | B2 | 4/2007 | Uchida |
| 7,314,169 | B1* | 1/2008 | Jasper .................... G06F 21/31 235/382 |
| 7,319,532 | B2 | 1/2008 | Oomura et al. |
| 7,400,427 | B2* | 7/2008 | Honma ........................ 358/1.15 |
| 7,505,156 | B2* | 3/2009 | Tsunekawa .................. 358/1.14 |
| 7,609,412 | B2 | 10/2009 | Maruyama |
| 8,253,952 | B2* | 8/2012 | Tsuchitoi .............. G06F 3/1204 358/1.13 |
| 2003/0167336 | A1 | 9/2003 | Iwamoto et al. .............. 709/229 |
| 2004/0141203 | A1 | 7/2004 | Honma |
| 2005/0088701 | A1 | 4/2005 | Uchida et al. |
| 2005/0248811 | A1* | 11/2005 | Nakagiri ............... G06F 3/1028 358/1.18 |
| 2005/0275867 | A1* | 12/2005 | Higashiura ............ G06K 15/00 358/1.14 |
| 2005/0275868 | A1* | 12/2005 | Higashiura .......... G06K 15/002 358/1.14 |
| 2006/0066907 | A1 | 3/2006 | Nakata et al. |
| 2006/0082802 | A1* | 4/2006 | Furuya ................. G06F 3/1206 358/1.13 |
| 2006/0147236 | A1 | 7/2006 | Uchida et al. |
| 2006/0177255 | A1* | 8/2006 | Mizoi ............................ 400/62 |
| 2006/0187486 | A1* | 8/2006 | Tsuchitoi .............. G06F 3/1204 358/1.15 |
| 2006/0238786 | A1* | 10/2006 | Sakura et al. ................... 358/1.9 |
| 2007/0091348 | A1* | 4/2007 | Asaka .................. G03G 15/553 358/1.14 |
| 2007/0177212 | A1 | 8/2007 | Uchida |
| 2007/0231038 | A1 | 10/2007 | Uchida |
| 2008/0028448 | A1* | 1/2008 | Tsuchitoi ............. G06K 3/1214 726/6 |

FOREIGN PATENT DOCUMENTS

| | | |
|---|---|---|
| JP | 2002259100 A | 9/2002 |
| JP | 2003-150336 | 5/2003 |
| JP | 2004-005241 | 1/2004 |
| JP | 2004-192273 | 7/2004 |
| JP | 2004-220532 | 8/2004 |

OTHER PUBLICATIONS

Japanese Office Action dated Jan. 21, 2011 concerning JP 2006-100399.
European Search Report issued Dec. 5, 2011 in corresponding European Patent Application No. 07740762.5.

* cited by examiner

FIG. 2

| USER NAME<br>201 | PASSWORD<br>202 | MAXIMUM PRINTABLE PAGE COUNT VALUE<br>203 | RECORDED PAGE COUNT VALUE<br>204 | |
|---|---|---|---|---|
| User 1 | Akd5sj4f | 500 | 123 | ~211 |
| User 2 | saFjf98w | 1000 | 515 | ~212 |
| User 3 | vGks9jgla | 2000 | 1021 | ~213 |
| Guest | NO PASSWORD | 0 | 0 | ~214 |

F I G. 16

CONTROL DISPLAY STATE INFORMATION

| | |
|---|---|
| DOCUMENT NAME | VALID |
| NUMBER OF COPIES | INVALID |
| PRINT METHOD | INVALID |
| STAPLE | INVALID |
| SADDLE STITCH | INVALID |
| UNIFY OUTPUT PAPER SIZE | INVALID |
| UNIFY LAYOUT | INVALID |
| LAYOUT ORDER | INVALID |
| SET BREAK OF DOCUMENT | INVALID |
| ADVANCED SETTINGS | VALID |
| DELETE PAGE | VALID |
| PRINT PREVIEW | VALID |

PRINT FUNCTION LIMITING METHOD AND PRINT CONTROL APPARATUS

TECHNICAL FIELD

The present invention relates to a print function limiting method of a print system including a print control apparatus, print authorization management server, and printing apparatus which connect to a network, and a print control apparatus.

BACKGROUND ART

For a system of this type, recently, how to reduce TCO including not only the initial installation cost of printers and systems but also the cost of expendables such as coloring agents represented by toners and print paper sheets has received a great deal of attention from the viewpoint of cost reduction in offices or preservation of the global environment. The above-described TCO is short for Total Cost of Ownership.

As a conventional problem, anyone who can access a network can print using a printer installed in an office. Anyone can print without limitations and without leaving any traces. In addition, there is no psychological check imposed on the user, and printing is sometimes done more than necessary, resulting in an increase in cost for the office.

As a first measure against these problems, printing is restricted by address information such as an IP address in TCP/IP. As a second measure, many print systems are put into practical use to manage the number of printed pages by acquiring a print log. The former is a rough measure to impart a limitation on a specific IP address. Finer management by, e.g., limiting the number of output pages of a specific user is impossible. The latter method can leave a log of output. However, to make the administrator monitor each log and investigate the presence/absence of unauthorized printing, a high human cost is required, contrary to the purpose of TCO reduction.

To solve the above-described problems, a user limitation function that limits the output by each user has been proposed (e.g., patent reference 1: Japanese Patent Laid-Open No. 2003-150336).

FIG. 1 is a schematic view showing an arrangement to practice the conventionally proposed function of limiting the output by each user. Referring to FIG. 1, a user uses a host computer 101 to generate and print image data. An authentication server 102 holds the authentication information and output limitation information of each user. A printing apparatus 103 receives print data via a network and prints it on an actual print paper sheet using a known technique such as electrophotography or inkjet. The host computer 101, authentication server 102, and printing apparatus 103 connect to each other via a network 104 based on a known technique such as Ethernet®.

FIG. 2 is a view showing a database that stores the authentication information and limitation information of each user, which are held by the authentication server 102. Referring to FIG. 2, the rows indicate the entries of users, and the columns indicate the authentication information and limitation information of the users. Reference numeral 201 denotes a user name; 202, a password; 203, a maximum printable page count value assigned to each user for this month; and 204, a recorded page count value indicating the number of pages actually output by each user in this month.

The password 202 is a plaintext, for the sake of convenience. Actually, to prevent password leakage from the viewpoint of security, for example, only a one-way hash value of a plaintext is stored and compared with the hash value of an input password, thereby executing authentication. However, this is not the main basis of the present invention, and a detailed description thereof will be omitted.

Only the administrator can read/write-access the database from the viewpoint of security, as a matter of course.

A row 211 indicates the entry of a user named User1. The password has a character string "Akd5sj4f". The maximum printable page count value is "500". That is, the number of printable pages per month is limited to 500 for User1. The recorded page count value is updated by the printer when printing is actually executed. As is apparent, User1 has already printed "123" pages in this month.

Similarly, a row 212 defines User2, and a row 213 defines User3. A row 214 describes a guest user. In this case, no password is set. However, since the maximum printable page count value is "0", the guest user cannot print. Whether a guest user is defined depends on the system policy. Such a user can be either present or absent.

Upon login to the host computer 101, the user inputs a user name and a password as authentication information. The authentication information is sent to the authentication server 102. The authentication server 102 collates the user name and password with the user name 201 and password 202 in the database. If authentication has proved successful, the host computer 101 is notified of the maximum printable page count value and recorded page count value.

For example, when the user is User1, and authentication has succeeded, maximum printable page count value=500 and recorded page count value=123 are returned as return values. In actually printing a job, the host computer 101 recognizes that 500−123=377 pages are printable in consideration of the maximum printable page count value=500 and recorded page count value=123. Printing is executed if the number of pages of the print job is 377 or less. If the number of pages of the print job is 400, i.e., exceeds the upper limit, a warning is issued to prompt the user to do an operation.

FIG. 3 shows the graphical user interface (GUI) of a dialogue displayed by a printer driver in printing from the host computer 101. Referring to FIG. 3, reference numeral 301 denotes a dialogue; 302, a button to execute printing; and 303, a cancel button. When the user presses the button 302, the host computer 101 degenerates the number of output pages of the print job to 377 and executes printing. Since the remaining 23 pages are not output at this time, it may be impossible to obtain the user's desired print result. When the user presses the button 303, the print request itself is canceled. Hence, no side effect occurs.

On the other hand, several solutions have been proposed to limit various functions provided by the printer driver. One of the function limitation techniques inhibits function selection on the print setting dialogue window of the printer driver (e.g., patent reference 2: Japanese Patent Laid-Open No. 2004-220532).

In recent years, the function of a printer driver is extended to provide various functions. For example, a print preview or a thumbnail image is displayed before actual printing of a print job input from an application. In addition, a function of, e.g., accepting a change in settings is provided.

When a print function limiting system is formed for such a recent printer driver, it is impossible to impose consistent limitations on print jobs without cooperation between the portion that limits the functions and the portion that executes the functions.

An example will be described below in detail. For example, examine a system which executes an NUP print function in a printer driver and executes 2-UP printing in response to a 1-UP print request to save the number of print paper sheets, thereby reducing the TCO.

Settings of a print job input to the printer driver are detected. If a 1-UP print instruction setting is received from the print application, the instruction setting is rewritten to 2-UP printing. This allows for, in a normal case, inhibition of 1-UP printing and forcible execution of 2-UP printing.

Assume that a job with a 2-UP print instruction setting is input to the printer driver. Even in this case, if the function of allowing reset in the printer driver, as described above, is valid, the resetting function is executed so that the NUP print setting can be reset to 1-UP printing.

In the 2-UP print process in the printer driver, an image formation process of laying out two pages with a reduced size in one page is executed. After this process, the page is printed by 1-UP printing. From the 2-UP printing unit, it is impossible to discriminate between a job that is input with a 1-UP print setting and a job which already forms a 2-UP image and executes 1-UP printing.

More specifically, assume that 1-UP printing should be limited. If a print job having a 2-UP print setting has passed the entrance of the printer driver, and then, the user changes the setting to 1-UP printing by the resetting function, 1-UP printing cannot be limited.

DISCLOSURE OF INVENTION

The present invention realizes to impose print function limitations even on a resetting process after print job input to a print control apparatus, thereby limiting the print function like upon print job input.

According to one aspect of the present invention, there is provided a print function limiting method of a print system including a print control apparatus, a print authorization management server, and a printing apparatus, which connect to a network, the method comprising the steps of: changing a print setting of an input print job; and limiting a print function provided by the print control apparatus in accordance with a print authorization managed by the print authorization management server, wherein the print function is limited by inhibiting selection of the print function to be limited in the changing step.

According to another aspect of the present invention, there is provided a print function limiting method of a print control apparatus in a print system including the print control apparatus, a print authorization management server, and a printing apparatus, which connect to a network, the method comprising the steps of: changing a print setting of an input print job; and limiting a print function provided by the print control apparatus in accordance with a print authorization managed by the print authorization management server, wherein the print function is limited by inhibiting selection of the print function to be limited in the changing step.

According to still another aspect of the present invention, there is provided a print control apparatus comprising: print setting resetting means for changing a print setting of an input print job; and print function limiting means for limiting a print function in accordance with a print authorization managed by the print authorization management server, wherein the print setting resetting means limits the print function by inhibiting selection of the print function.

According to yet another aspect of the present invention, there is provided a print control apparatus comprising: driver extension means for changing a print setting of an input print job; and print function change means for disabling change of the print function by the driver extension means in accordance with a print authorization managed by a print authorization management server.

Further features of the present invention will become apparent from the following description of exemplary embodiments with reference to the attached drawings.

BRIEF DESCRIPTION OF DRAWINGS

FIG. 2 is a view showing a database that stores the authentication information and limitation information of each user, which are held by an authentication server 102;

FIG. 16 is a view showing an example of control display state information created by a print authorization processing unit 605.

BEST MODE FOR CARRYING OUT THE INVENTION

The best mode for carrying out the present invention will be described below in detail with reference to the accompanying drawings.

Figure 1:
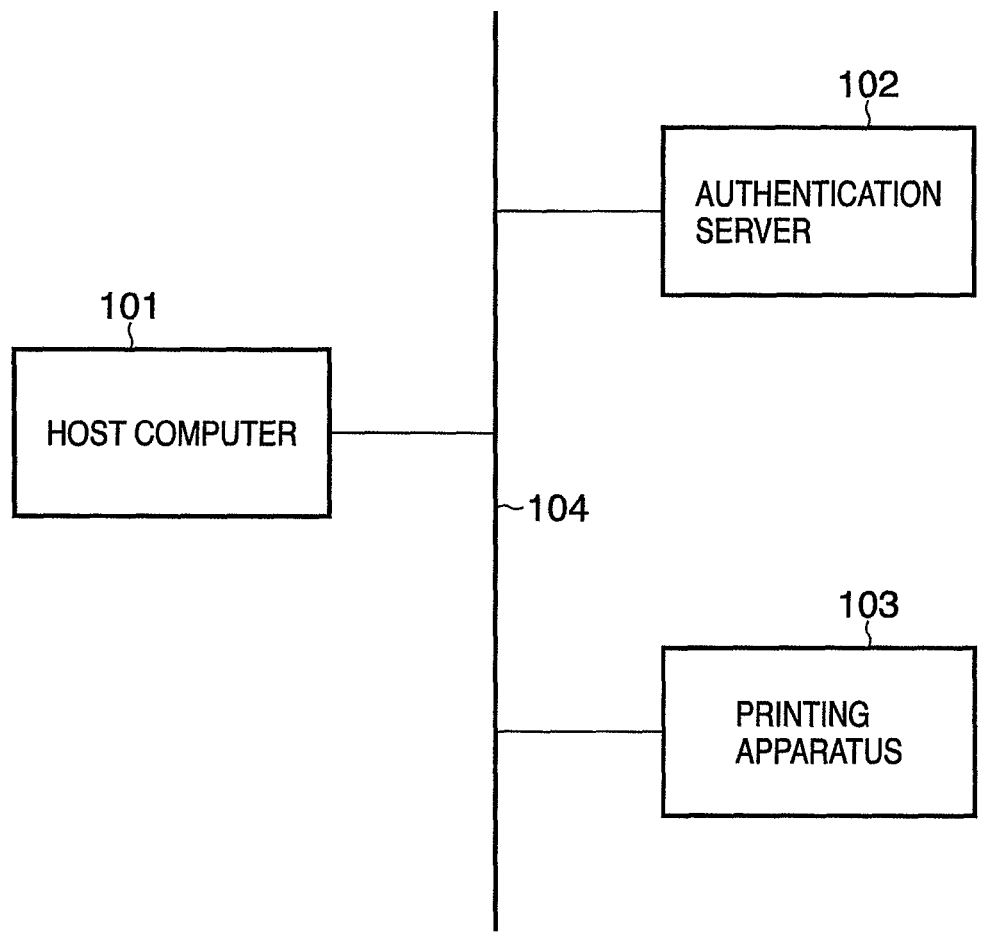
FIG. 1 is a schematic view showing an arrangement to practice the conventionally proposed function of limiting the output by each user.
Figure 3:
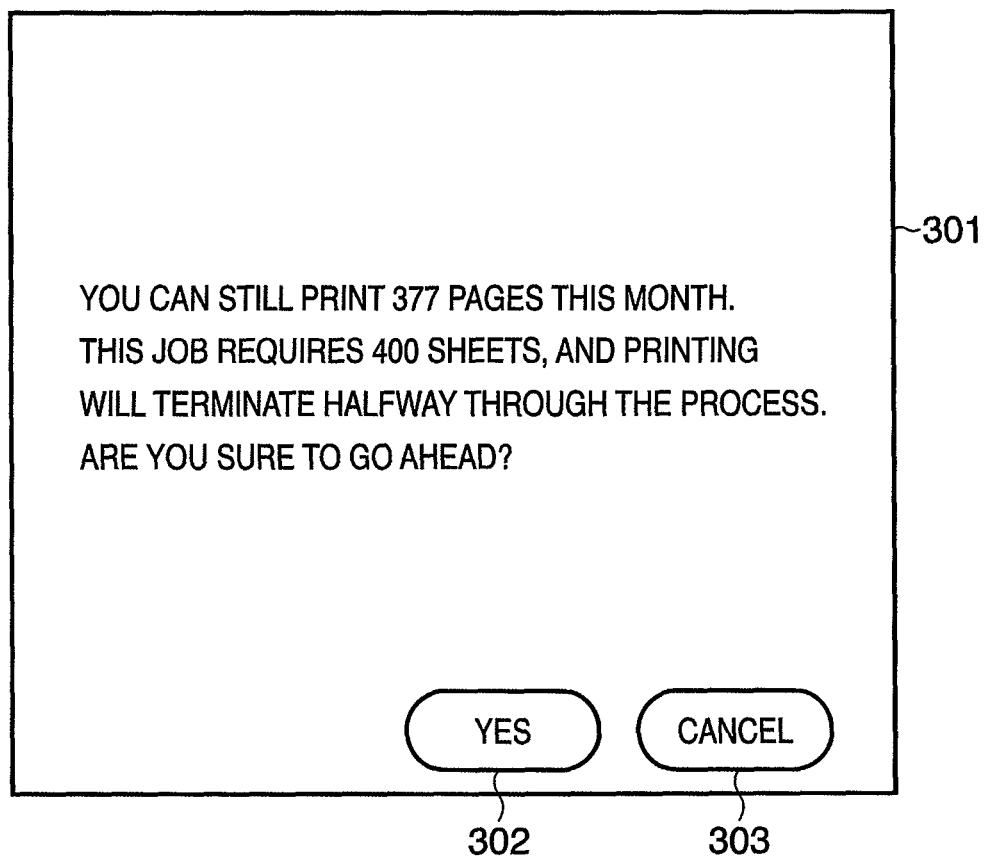
FIG. 3 is a view showing the graphical user interface (GUI) of a dialogue displayed by a printer driver upon printing from a host computer 101.
Figure 4:
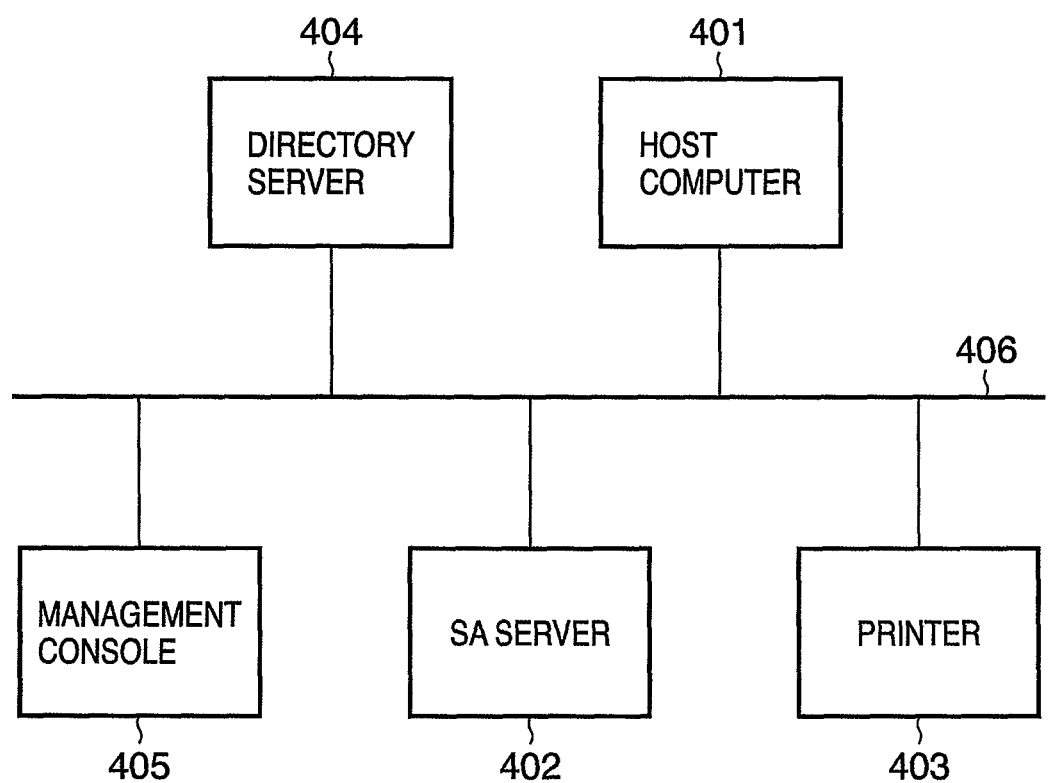
FIG. 4 is a block diagram showing an example of the configuration of a print system according to the embodiment.

FIG. 4 is a block diagram showing an example of the configuration of a print system according to the embodiment. Referring to FIG. 4, an application and a printer driver which are used by a user to generate image data and execute printing are installed in a host computer 401. An SA (Security Agent) server 402 is a computer to distribute a print authorization token to the host computer. A printer 403 receives print data via a network and prints it on an actual print paper sheet by using a known print technique such as electrophotography or inkjet. A directory server 404 has a print function limitation information database as the base of print authorization token generation. A management console 405 is a computer to manage the database mounted in the directory server 404.

The host computer 401, SA server 402, printer 403, directory server 404, and management console 405 connect to each other via a network 406 based on a known technique such as Ethernet®.

Figure 5:
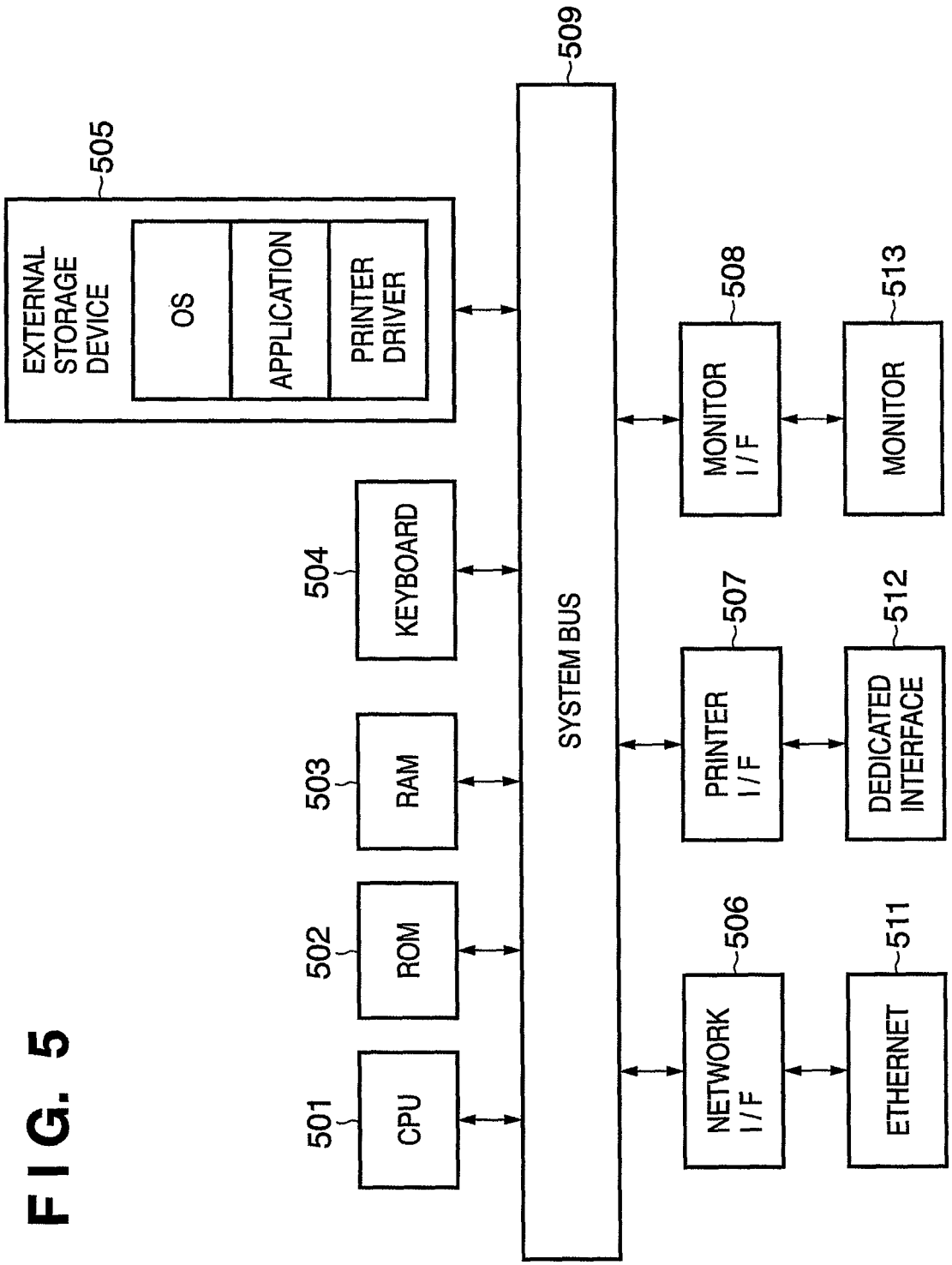
FIG. 5 is a block diagram showing the internal system of a host computer 401.

FIG. 5 is a block diagram showing the internal system of the host computer 401. A CPU 501 shown in FIG. 5 controls the overall apparatus in accordance with programs stored in a ROM 502, RAM 503, or external storage device 505. The RAM 503 is used by the CPU 501 as a work area to execute various kinds of processes. The external storage device 505 records an operating system (OS), application software, and printer driver software. An input device such as a keyboard 504 or a mouse (not shown) is used to input various of instructions.

A network I/F 506 and a printer I/F 507 connect to the printer via an Ethernet 511 and a dedicated interface 512 is used to transmit/receive data. A monitor I/F 508 connects to a monitor 513 to transfer display data. Reference numeral 509 denotes a system bus.

Figure 6:
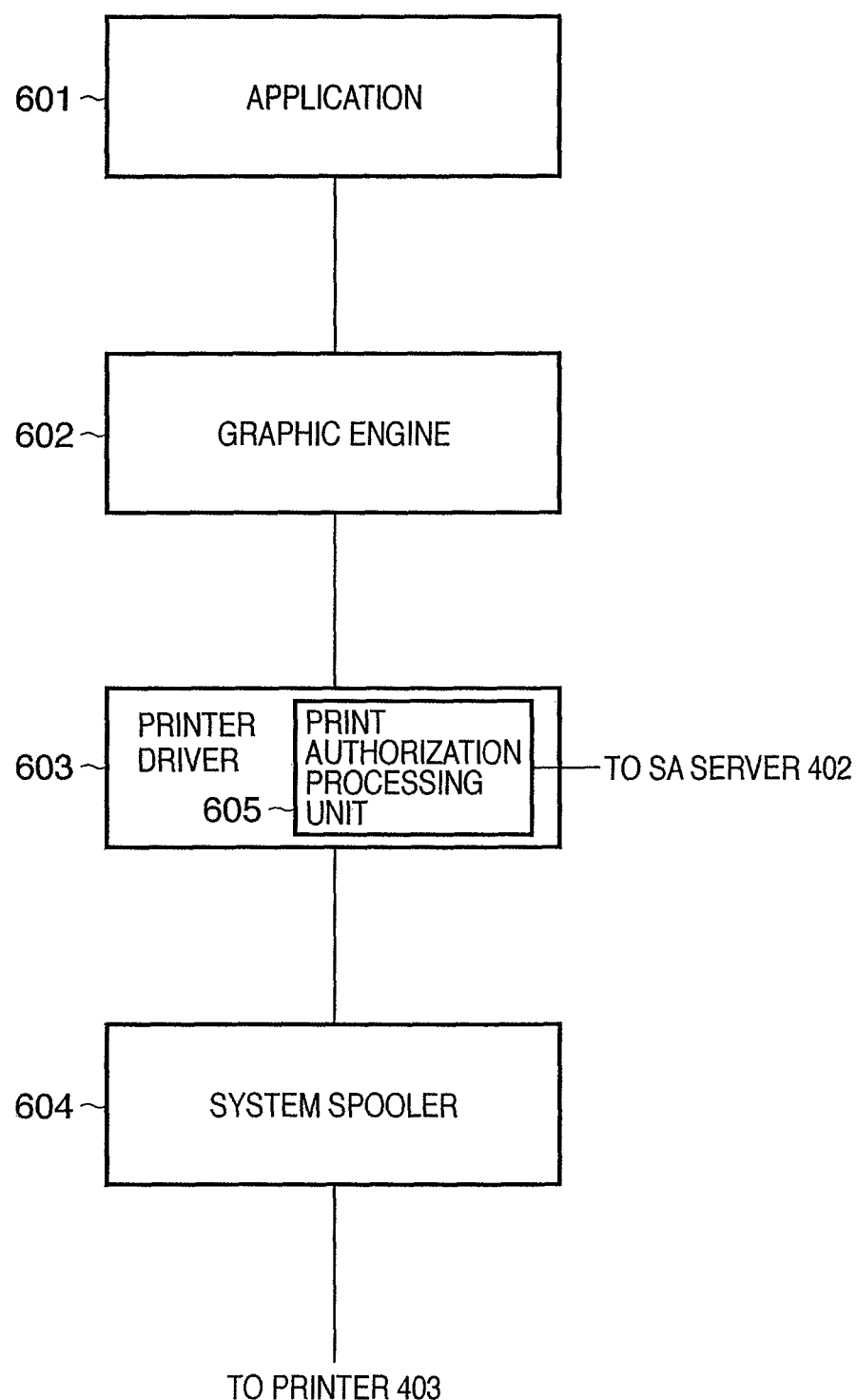
FIG. 6 is a block diagram showing a detailed arrangement for a print process in the host computer 401.

FIG. 6 is a block diagram showing a detailed arrangement for a print process in the host computer 401. As shown in FIG. 6, an application 601, graphic engine 602, printer driver 603, and system spooler 604 exist as files saved in the external storage device 505. These files are program modules which are loaded into the RAM 503 and executed by the OS or a module that uses the modules.

The application 601 and printer driver 603 can be added to the external storage device 505 via a network or an FD or CD-ROM (not shown) serving as an external memory.

The application 601 saved in the external storage device 505 is loaded to the RAM 503 and executed. However, if the application 601 causes the printer 403 to execute printing, output (rendering) is done by using the graphic engine 602 which is loaded into the RAM 503 and set in an executable state, like the application 601.

The graphic engine 602 loads the printer driver 603 prepared for each printer from the external storage device 505 to the RAM 503 and sets the output of the application 601 in the printer driver 603. The graphic engine 602 also converts a GDI (Graphic Device Interface) function received from the application 601 into a DDI (Device Driver Interface) function and outputs it to the printer driver 603.

The printer driver 603 converts print data into PDL data, i.e., a control command recognizable by the printer based on the DDI function received from the graphic engine 602. The converted PDL data is output as a print job from the system spooler 604 loaded into the RAM 503 by the OS to the printer 403 via the interface 507.

The print system of this embodiment also has a print authorization processing unit 605 in the printer driver 603. The print authorization processing unit 605 may be either a built-in module in the printer driver 603 or a library module added by individual installation.

When the printer driver 603 is executed for printing, the printer driver 603 loads the print authorization processing unit 605. When the print authorization processing unit 605 is loaded, information necessary for print function limitation is collected on the host computer 401 and transmitted to the SA server 402. The print authorization processing unit 605 receives a print authorization token from the SA server 402 as a reply. In accordance with the received print authorization token, the print authorization processing unit 605 transmits the generated PDL data to the system spooler 604. The print job is output from the system spooler 604 to the printer 403 via the interface 507.

Figure 7:
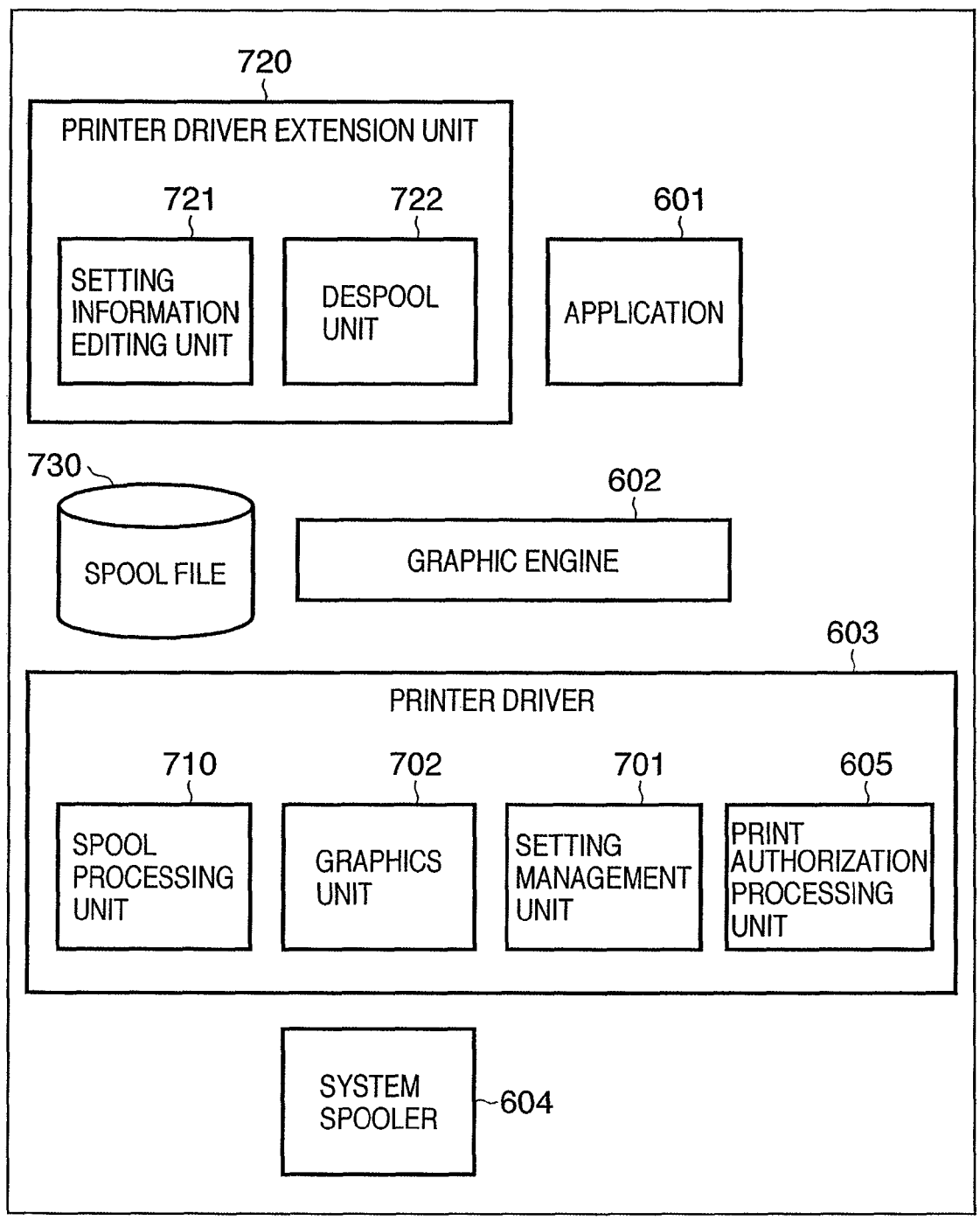
FIG. 7 is a block diagram showing the structure in a printer driver 603 in more detail.

FIG. 7 is a block diagram showing the structure in the printer driver 603 in more detail. When the printer driver 603 and a printer driver extension unit 720 shown in FIG. 7 function, it is possible to generate a PDL job with a changed print setting condition after a print job issued by the application 601 is input to the application 601.

The printer driver 603 includes a setting management unit 701, graphics unit 702, spool processing unit 710, and printer driver extension unit 720. The setting management unit 701 manages print setting information and displays a GUI for print setting, in addition to the above-described print authorization processing unit 605. The graphics unit 702 receives print setting and rendering data from the graphic engine 602, converts it into PDL data, and transfers it to the system spooler 604. The spool processing unit 710 receives the setting and rendering data from the graphics unit 702 and writes a temporary spool file 730. The printer driver extension unit 720 loads the spool file 730, processes the rendering data in accordance with setting information and a change in it described in the spool file 730, and executes a print process again via the graphic engine 602.

A setting information editing unit 721 displays a setting change GUI window for a setting item of the print job described in the spool file 730 and transfers setting information changed in the window to a despool unit 722. When the setting information editing unit 721 has changed a setting, the despool unit 722 receives the changed setting and generates print data that matches the print setting based on the rendering data in the spool file 730. The despool unit 722 invokes the graphic engine 602 again and gives the instruction for printing. If the setting information editing unit 721 inputs no setting change instruction, the instruction for generation of print data that matches the setting information stored in the spool file 730 is given.

These components are known, and a description thereof will be omitted here.

A process of causing the user to activate the application 601 in the host computer 401 and causing the printer 403 to print in the above-described arrangement will be described.

Figure 8:
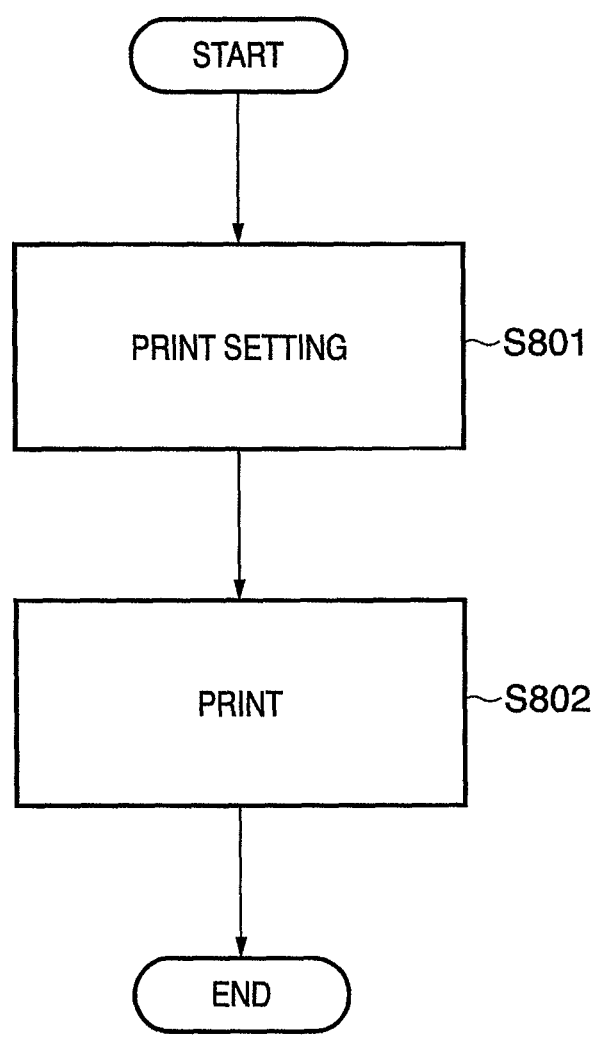
FIG. 8 is a flowchart showing the outline of the print process according to the embodiment.

FIG. 8 is a flowchart showing the outline of the print process according to the embodiment. This process is a print procedure by a general print application.

When printing is to be executed from the application 601 in the host computer 401, in step S801, the user executes necessary print settings. Then, in step S802, printing is executed.

Figure 9:
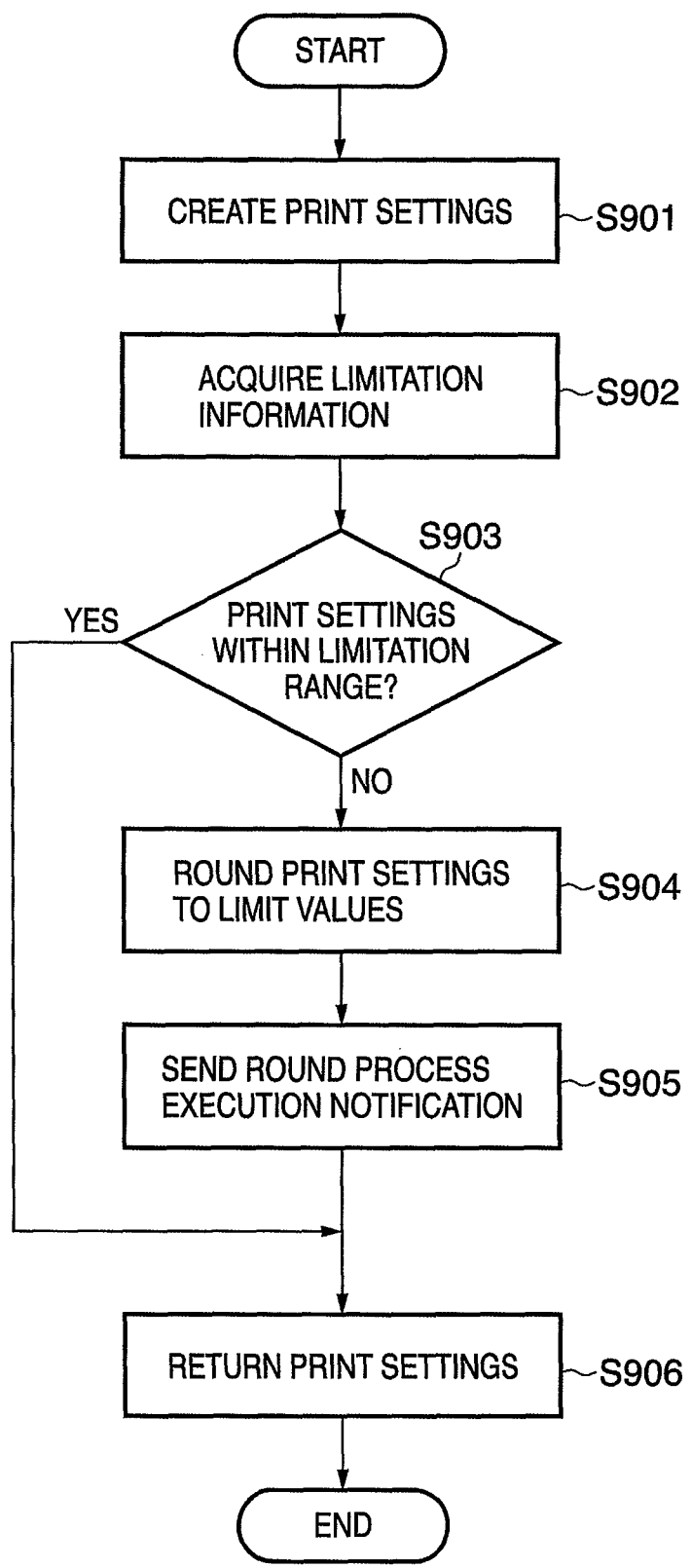
FIG. 9 is a flowchart showing details of a print setting process (S801) according to the embodiment.

FIG. 9 is a flowchart showing details of the print setting process (S801) according to the embodiment. The printer driver 603 executes this process.

When a print setting request is received from the application 601, a print setting information area is generated, and current set values are written in this area in step S901. This process also includes, e.g., a process of opening various function setting windows of the printer driver 603 and making the user input various kinds of desired settings. The print authorization processing unit 605 acquires a print token from the SA server 402 at the timing of print setting request (S902).

The print authorization token contains limitation information items about various functions for printing. The print authorization token contains limitation information indicating authorization/unauthorization of single-sided printing, authorization/unauthorization of color printing, and limitation of print layout (only 2-UP printing or imposition of at least four pages is authorized).

In the above-described method, the user's desired settings and limitation information defined by the limiting system are acquired. It is checked whether the user's desired settings fall within the range of limitation defined by this system (S903). If the user's desired settings fall within the limitation range for all limited items, the process advances to step S906 to return the user's desired settings to the setting request source (application 601). The print setting process is thus ended.

If the user's desired setting for at least one of the limited items exceeds the limitation defined by the system, the user set value is rewritten in all items that exceed the limitation such that the set value falls within the limitation range (S904).

If a setting exceeds the limitation, printing under the user's desired settings is impossible. For the items with the rewritten settings, the set values before the change are saved. A message to notify the user of the set values before and after the change is displayed (S905). The set values rewritten to values in the limitation range are returned to the setting request source (application 601). The print setting process is thus ended.

For message display, ON/OFF setting may independently be provided. Whether to display the message may be decided in accordance with the setting.

Printing with designation of the editing function of this embodiment, i.e., a case wherein a print setting change UI window is opened for a print job input from the application so that the print settings can be changed as needed will be described next.

Figure 10:
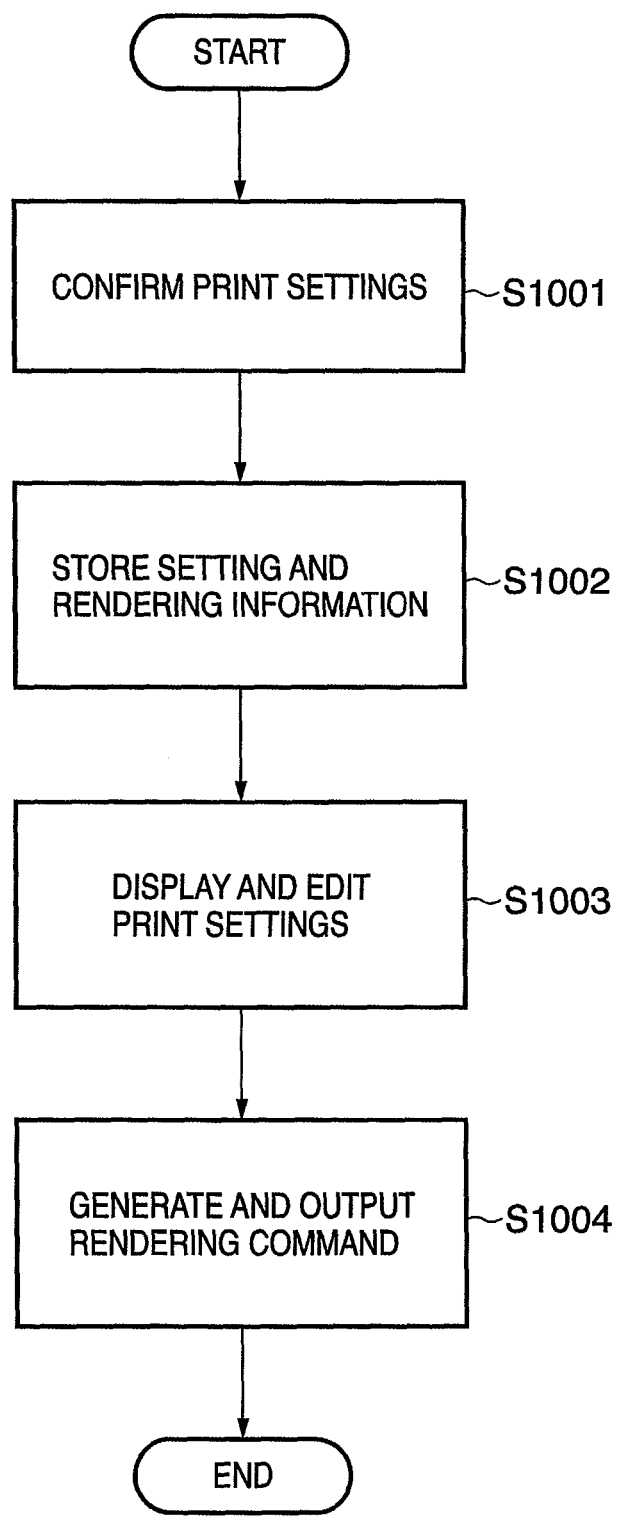
FIG. 10 is a flowchart showing details of a print process (S802) according to the embodiment.

FIG. 10 is a flowchart showing details of the print process (S802) according to the embodiment. First, the application 601 issues a print instruction to the printer driver 603. The printer driver 603 confirms print setting information in step S1001. This process is executed for the purpose of checking print settings because some applications do not invoke the printer driver 603 before printing to determine the print settings. The confirmation process is almost the same as the process shown in FIG. 9. It is checked whether the received print setting information falls within the range of acquired limitation information. If a print setting falls outside the limitation range, the setting item is changed such that the set value falls within the limitation range. That is, the set values immediately after step S1001 fall within the limitation range independent of the system that inputs the print job to the printer driver 603.

In step S1002, the determined setting information and rendering data sent from the graphic engine 602 are transferred to the spool processing unit 710. The spool processing unit 710 stores the information as the spool file 730. When necessary information is stored in the spool file 730, the setting information editing unit 721 is activated to open a dialogue with a print setting change GUI in step S1003.

In a print system without application of the present invention, the user can freely change the settings in this window. In the present invention, each control of the GUI can be displayed in a valid or invalid state.

To execute the print process, the user must give the instruction for printing again. This process will be described later in detail.

When a print instruction is received from the user, the process advances to step S1004. The despool unit 722 generates print data that matches the print settings based on the rendering data in the spool file 730. The graphic engine 602 is invoked again. By using the graphics unit 702 in the printer driver 603, PDL data that can be transmitted to the printer 403 is generated.

Figure 11:
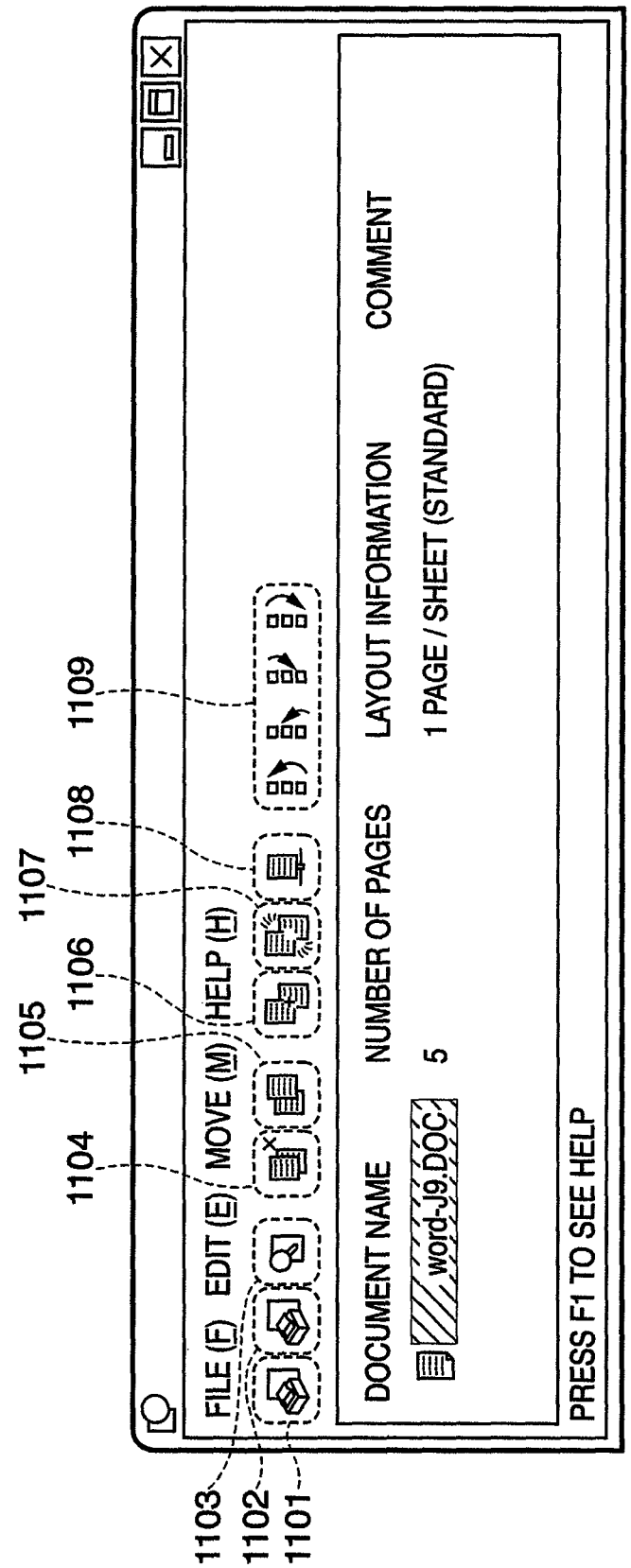
FIG. 11 is a view showing an example of a job control window displayed upon changing print settings.

Before activation of the setting information editing unit 721, the window shown in FIG. 11 is displayed so that various kinds of control for the received job can be executed.

FIG. 11 is a view showing an example of a job control window displayed upon changing print settings. Referring to FIG. 11, reference numerals 1101 to 1109 denote buttons to instruct various kinds of control for the received job. In this case, the "print" 1101, "test print" 1102, "preview" 1103, "delete" 1104, "copy" 1105, "combine jobs" 1106, "segment combined job" 1107, "change print setting" 1108, and "control job order" 1109 are executable.

To activate the above-described setting information editing unit 721, it is necessary to give the instruction for "change print setting" 1108.

A print setting change window displayed when the instruction for "change print setting" 1108 is given will be described. First, a print setting window without application of the present invention will be described.

Figure 12:
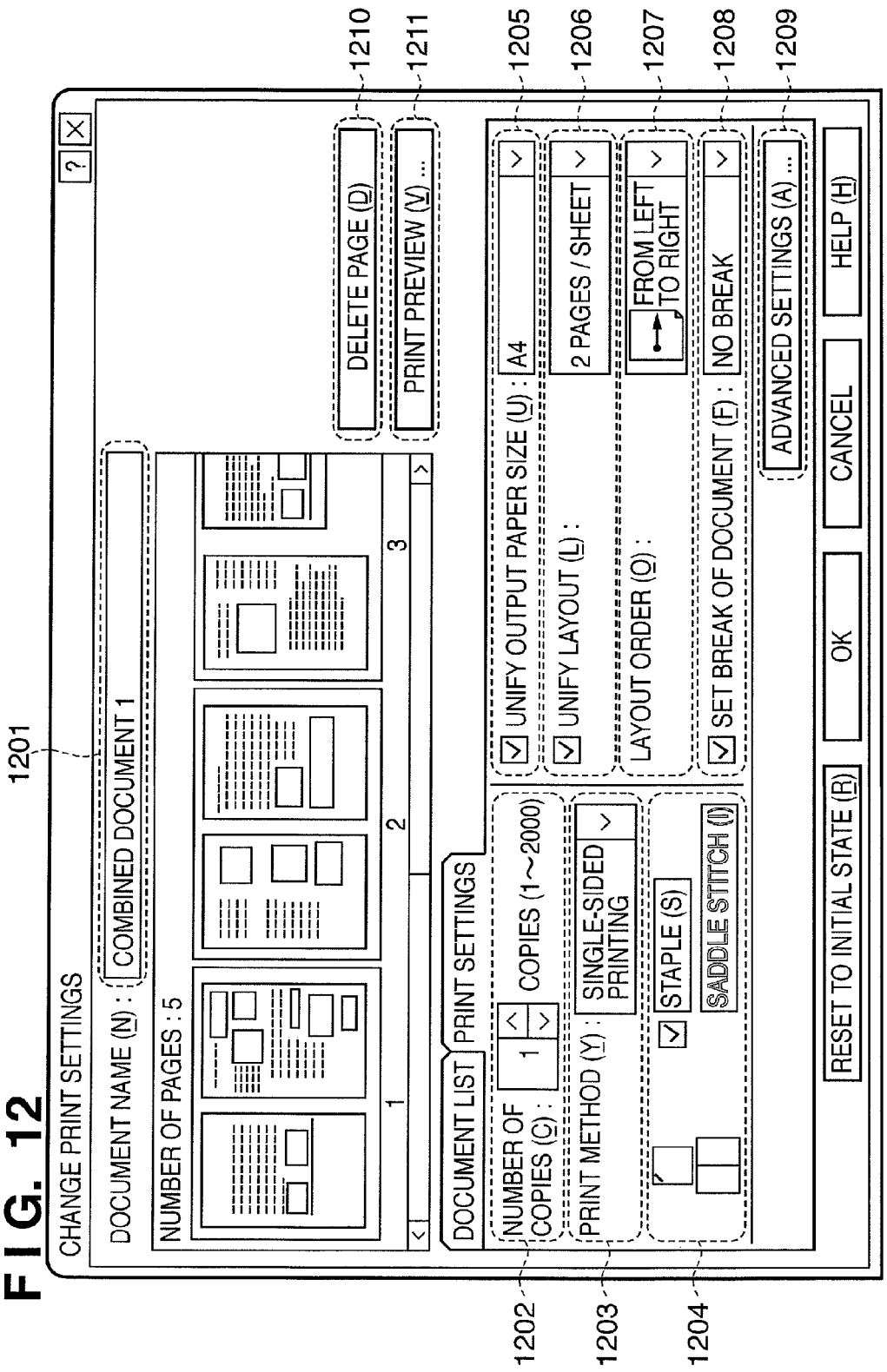
FIG. 12 is a view showing an example of a print setting window without applying the present invention.

FIG. 12 is a view showing an example of a print setting window without application of the present invention. Print setting change and other functions in this window will be described. In "document name" 1201 shown in FIG. 12, the user can change the job name used in printing. "Number of copies" 1202 allows for changing the number of copies to be printed. "Print method" 1203 allows switching of the print mode between single-sided printing, double-sided printing, and bookbinding. "Staple and saddle stitch" 1204 allows for designating ON/OFF of stapling in single- or double-sided printing and ON/OFF of saddle stitching in bookbinding.

"Unify output paper size" 1205 allows for designation of the paper size to be output. "Unify layout" 1206 allows for designation of a print layout such as NUP printing or poster printing. "Layout order" 1207 allows for designation of the page layout order in a designated layout. "Set break of document" 1208 allows for designation of "no break", "change sheet", or "change page" for how to break a combined document. With "advanced settings" 1209, a driver UI setting window (not shown) is displayed so that settings of items other than those described above can be changed.

When the "advanced settings" 1209 is clicked on, the same process as in step S801 is executed.

"Delete page" 1210 allows deletion of a page selected in a thumbnail area, although it is not a setting change. "Print preview" 1211 allows display of a preview window of a print job (not shown).

The print setting display/editing process (S1003) shown in FIG. 10 will be described in detail with reference to FIG. 13. A process after designating the "change print setting" 1108 in the window shown in FIG. 11 will be described. The window shown in FIG. 12 is a setting window displayed by the printer driver extension unit 720.

Figure 13:
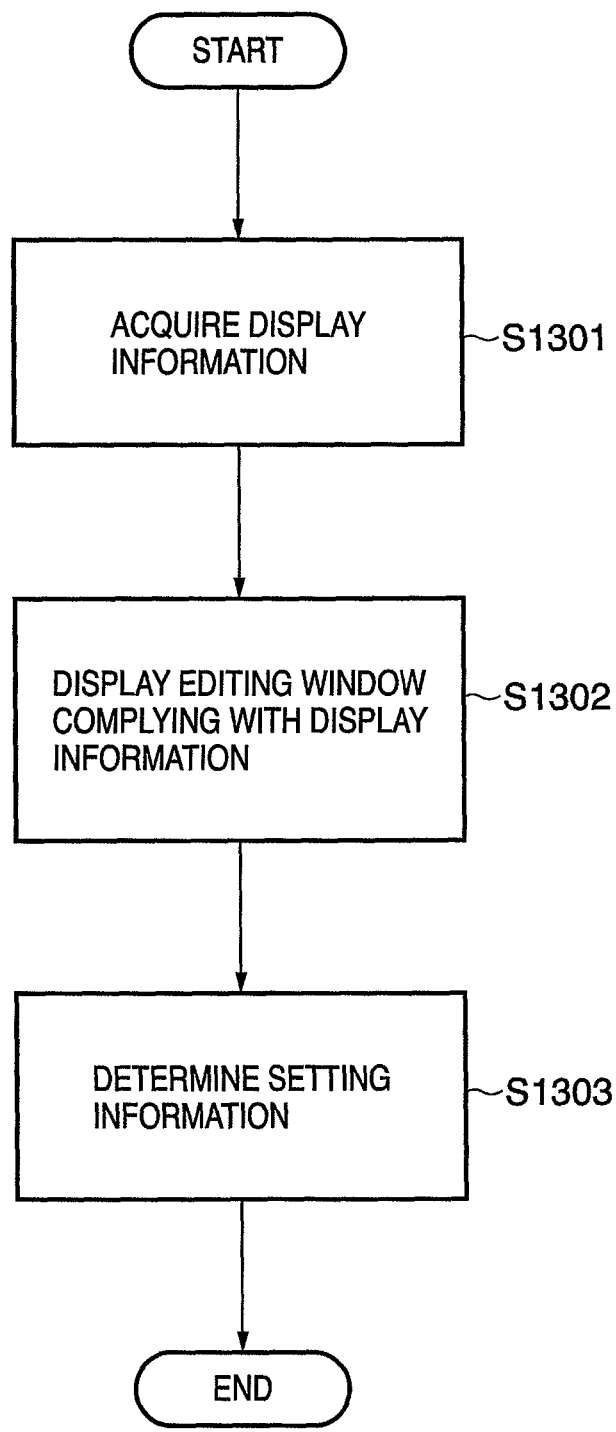
FIG. 13 is a flowchart showing a print setting display/editing process according to the embodiment.
Figure 14:
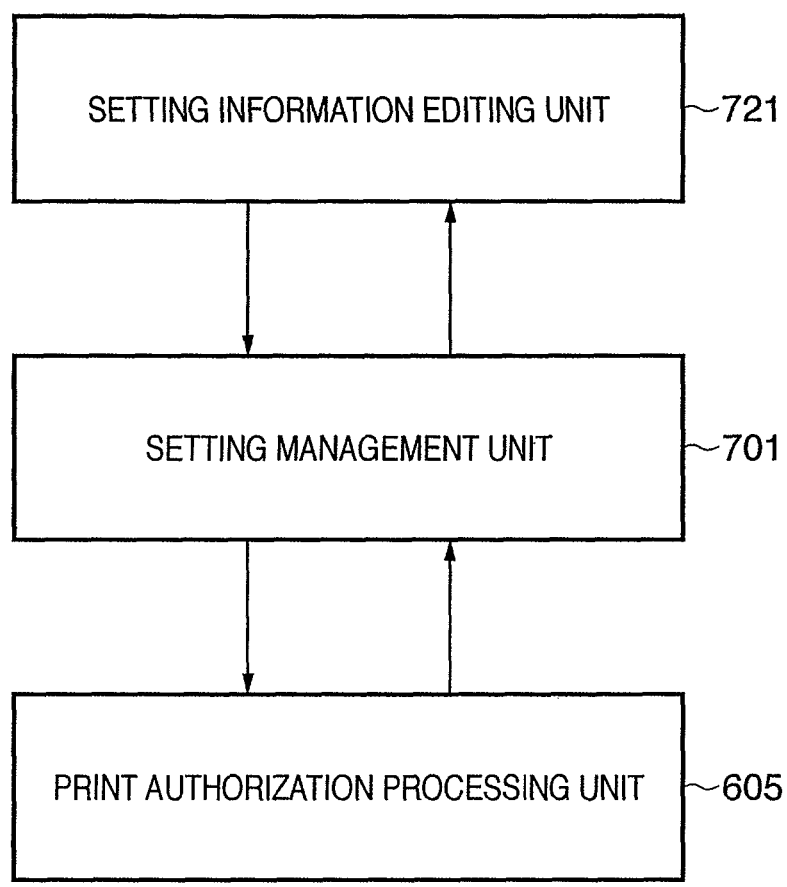
FIG. 14 is a view showing a control display state information acquisition route.

FIG. 13 is a flowchart showing the print setting display/editing process according to the embodiment. In step S1301, the setting information editing unit 721 inquires of the print authorization processing unit 605 via the setting management unit 701 about limitation information (control display state information) for display. FIG. 14 is a view showing a control display state information acquisition route.

The print authorization processing unit 605 decides on the display state of a control that must inhibit setting change in the setting change window based on the information described in the print authorization token. The possible display state is one of "valid", "invalid", and "OFF". The display state of each control is decided on in accordance with, e.g., the following guideline.

Document name: invalid when management is done based on the document name.

Number of copies: invalid when managing printing of an enormous number of copies.

Print method: invalid when single-side printing is inhibited, or the print mode is limited to 4-UP printing or more.

Bookbinding indicates a print mode to obtain a book form by folding paper sheets in two and stitching them in 2-UP+ double-sided printing. If 2-UP printing is limited, bookbinding is determined to be impossible.

Staple and saddle stitch: invalid when limiting stapling or saddle stitching itself.

Unify output paper size: invalid when, e.g., limiting output to a specific paper size.

Unify layout: invalid when, e.g., limiting the print layout.

Layout order: set in the same state as the control "unify layout".

Set break of document: invalid when limiting the method of break of a document formed by combining jobs.

Advanced settings: invalid in limiting a change in the driver UI window.

Delete page: invalid when limiting the process of deleting pages from the received job.

Print preview: invalid when limiting the print preview function itself.

Instead of deciding on valid/invalid of the display state of each control, as described above, all the controls 1202 to 1208 in the print setting tab shown in FIG. 12 are invalidated, and the "advanced settings" 1209 may be validated.

Figure 15:
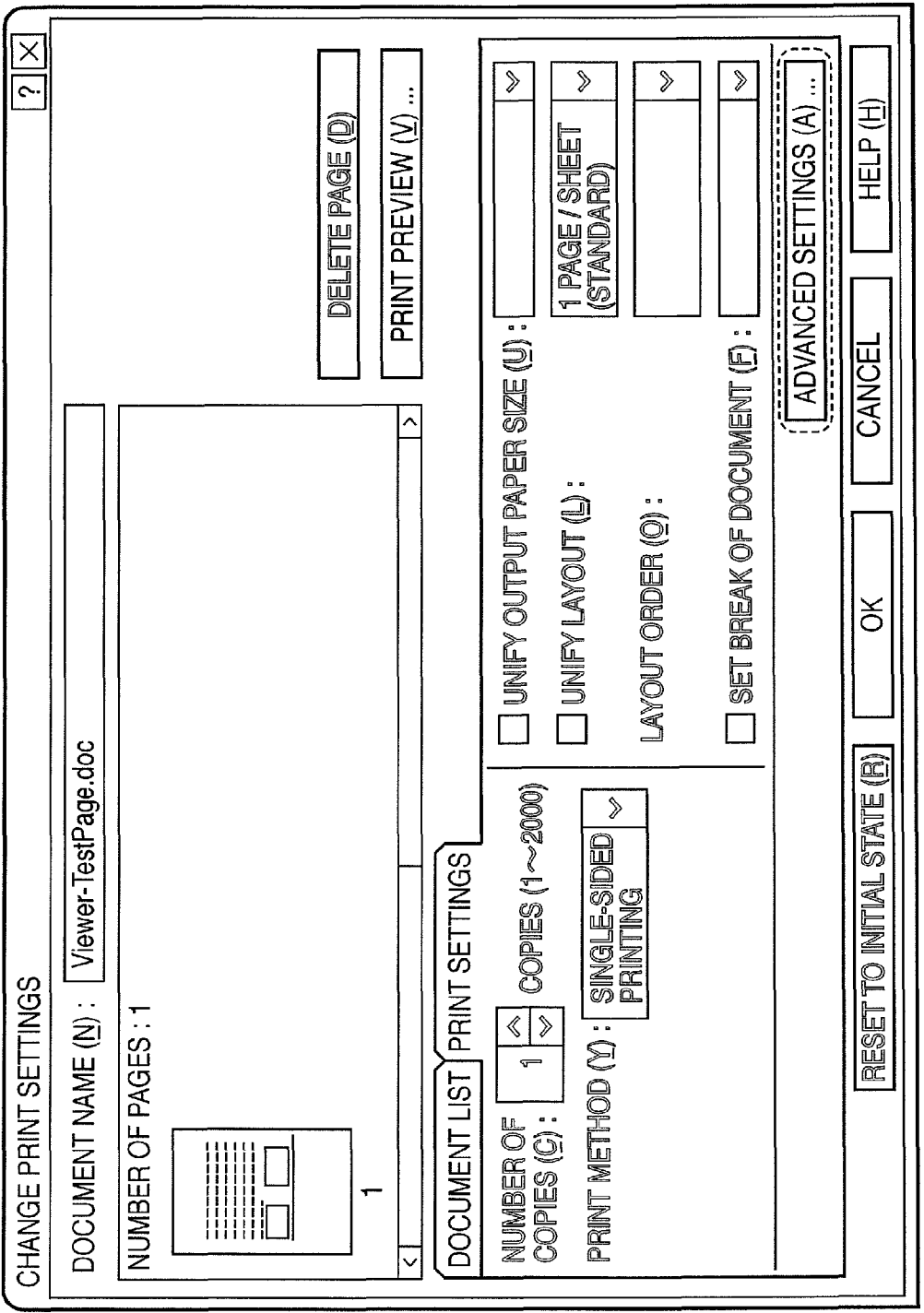
FIG. 15 is a view showing a print setting window when all controls 1202 to 1208 in the print setting tab are invalidated, and an advanced setting 1209 is validated.

FIG. 15 is a view showing a print setting window when all the controls 1202 to 1208 in the print setting tab are invalidated, and the "advanced settings" 1209 is validated. When the "advanced settings" 1209 instruction is given by the user, the printer driver 603 displays this window. The controls of the setting window of the printer driver 603 are not invalidated based on the information described in the print authorization token. This is because there are no limitations when the printer driver is processing the print data.

As described above, in setting change using the setting management unit 701 in the printer driver 603, appropriate processes such as the process of checking limitations and changing the set values outside the limitation range and the process of notifying the user of the values before and after the change are executed in step S903.

The print resetting target for the user can be expanded by validating the "advanced settings" 1209. Even when setting change beyond the limitation on the limiting system side is done, the user can be notified of the reason why the setting change is not permitted. This embodiment is therefore preferable.

The print authorization processing unit 605 generates control display state information in accordance with the above-described guideline. In this case, control display state information with the "document name", "advanced settings", "delete page", and "print preview" displayed in the valid state is generated, as shown in FIG. 16.

Referring back to FIG. 13, in step S1302, the setting information editing unit 721 displays a print setting change window in accordance with the control display state information received from the print authorization processing unit 605. The print setting change window need not always be displayed in accordance with the received control display state information. If the target controls need not be displayed, they are not displayed independently of the control display state information.

For example, when a printer without the stapling and saddle stitching function is set as the output target, the corresponding control is not displayed independently of the control display state information about the control.

For controls invalid in the initial state, the states of the controls in the control display state information are checked when the procedure of validating the normal controls is executed. If the control state is valid, the control is displayed in the valid state. If the control state is invalid, the control is displayed in the invalid state.

For example, the control of the "delete page" 1210 is invalid in the initial state when the print setting change window is displayed. This control is validated only when a target page is selected in the thumbnail window. Independently of the value in the control display state information, the control of the "delete page" 1210 is invalid in the initial state.

For example, the print setting change window shown in FIG. 15 is displayed in accordance with control display state information shown in FIG. 16. The output target printer has no stapling and saddle stitching function, so the corresponding control is not displayed. In the control display state information, the control of "delete page" is valid. However, no page is selected in the thumbnail window, so the control of "delete page" is displayed in the invalid state.

When the print setting change window is displayed in the above-described way, setting change can be done only for setting items permitted by the limiting system. In other words, setting change inhibited by the limiting system cannot be executed from the print setting change window.

In step S1303, the user clicks on the OK button in the window, thereby executing the setting changes made in the print setting change window.

The window shown in FIG. 11 is restored. When the "print" instruction is given in this window, the print setting information changed in the print setting change window is transferred to the despool unit 722. Print data corresponding to the settings is generated and printed.

Other Embodiment

In the above-described embodiment, the process functions of the host computer 101, authentication server 102, and printing apparatus 103 are implemented by reading out the programs to implement them from the memory and causing the CPU (Central Processing Unit) to execute the programs. However, the present invention is not limited to this. Dedicated hardware may implement all or some of the process functions.

The above-described memory can be a nonvolatile memory such as a magnetooptical disk device, a read-only recording medium such as a CD-ROM, a volatile memory except a RAM, or a computer-readable/writable recording medium by combining them.

The programs to implement the functions in the host computer 101, authentication server 102, and printing apparatus 103 are recorded in a computer-readable recording medium. The programs recorded in the recording medium are loaded into the computer system and executed. The processes may be executed in this way.

The "computer system" includes the OS and hardware such as peripheral devices. More specifically, the programs are written in the memory of a function expansion board inserted into the computer or a function expansion unit connected to the computer, and the CPU wholly or partially executes actual processing based on the instructions of the programs. The functions of the above-described embodiments are also implemented in this way.

The "computer-readable recording medium" indicates a portable medium such as a flexible disk, magnetooptical disk, ROM, CD-ROM and a storage device such as a hard disk incorporated in the computer system. The "computer-readable recording medium" also includes a medium that holds a program for a predetermined period, including a RAM in a computer system serving as a server or client to which a program is transmitted via a network or communication channel.

The program may be transmitted from the computer system that stores the program in, e.g., a storage device to another computer system via a transmission medium or a transmission wave in a transmission medium. The "transmission medium" to transmit the program indicates a medium having a function of transmitting information, including a network (communication network) such as the Internet and a communication channel (communication line) such as a telephone line.

The program may implement some of the above-described functions. The program may be a so-called difference file (difference program) that implements the above-described functions upon being combined with an already recorded program.

A program product such as a computer-readable recording medium recording the program is also applicable as the embodiment of the present invention. The program, recording medium, transmission medium, and program product are incorporated in the present invention.

The present invention has been described with reference to the preferable embodiment. The present invention is not limited to the above-described embodiment, and various changes and modifications can be made within the spirit and scope of the present invention.

While the present invention has been described according to its preferred embodiment, the present invention is not limited to the described embodiment but various modifications can be made within the scope set forth in the claims.

This application claims the benefits of Japanese Patent Application No. 2006-100399, filed Mar. 31, 2006, which is hereby incorporated by reference herein in its entirety.

The invention claimed is:

1. An information processing apparatus for executing a printer driver that includes a printer driver extension unit, comprising:
    a display unit configured to display a print setting window of the printer driver in response to receiving a print setting request;
    an acquiring unit, implemented by a processor, configured to acquire a print token by a server when receiving the print setting request the print job has been issued by the application, the print token including limitation information;
    a rewrite unit, implemented by a processor, configured to rewrite, if a user's desired setting for at least one item included in the limitation information exceeds a limitation defined in the limitation information, a set value for the user's desired setting the desired user value in all items that exceed the limitation such that the set value falls within the limitation range;
    a save unit, implemented by a memory device, configured to save the set values before the rewrite;
    wherein the display unit is further configured to display a notification of the set values before and after the rewrite;
    a control unit, implemented by a processor, configured to generate, based on restriction information for restricting a print setting, a print job having a setting that is inhibited, after a print job has been issued by the printer driver by setting via the print setting window of the print driver displayed by the first display unit; and
    the display unit configured to display a print setting window of the printer driver extension unit different from the print setting window of the printer driver displayed by the display unit,
    wherein, after the print job having the setting that is inhibited has been read by the printer driver extension unit, the display unit displays the print setting window of the printer driver extension unit such that the print setting is displayed in an invalid state, and the invalid state is not changeable to the valid state.

2. The apparatus according to claim 1, wherein the print setting window of the printer driver extension unit displayed by the display unit includes a button for displaying the print setting window of the printer driver, and the print setting window of the printer driver is displayed again by the display unit when the button is pressed, and
    wherein, in a case where a print setting other than a setting for invalidating the specific print setting is input via the print setting window of the printer driver displayed again by the display unit, a print job that has restricted print processing based on the restriction information is stored in the spooler.

3. A method of controlling an information processing apparatus for executing a printer driver that includes a printer driver extension unit, the method comprising:
    a first display step of displaying a print setting window of the printer driver in response to receiving a print setting request;
    an acquiring step of acquiring a print token by a server when receiving the print setting request, the print token including limitation information;
    a rewrite step of rewriting, if a user's desired setting for at least one item included in the limitation information exceeds a limitation defined in the limitation information, a set value for the user's desired setting in all items that exceed the limitation such that the set value falls within the limitation range;
    a save step of saving the set values before the rewrite,
    wherein a notification of the set values before and after the rewrite is displayed:
    a control step of generating, based on restriction information for restricting a print setting, a print job having a setting that is inhibited, after a print job has been issued by the printer driver by setting via the print setting window of the print driver displayed in the first display step; and
    a second display step of displaying a print setting window of the printer driver extension unit different from the print setting window of the printer driver displayed in the first display step,
    wherein, after the print job having the setting that the print setting is inhibited has been read by the printer driver extension unit, the second display step displays the print setting window of the printer driver extension unit such that the print setting is displayed in an invalid state, and the invalid state is not changeable to the valid state.

4. The method according to claim 3, wherein the print setting window of the printer driver extension unit displayed in the second display step includes a button for displaying the print setting window of the printer driver, and the print setting window of the printer driver is displayed again in the first display step when the button is pressed, and wherein, in a case where a print setting other than a setting for invalidating the specific print setting is input via the print setting window of the printer driver displayed again in the first display step, a print job that has restricted print processing based on the restriction information is stored in the spooler.

5. A non-transitory computer-readable medium storing a printer driver for causing a computer to execute a method of claim 3.

* * * * *